United States Patent
Milillo et al.

(10) Patent No.: US 9,452,945 B2
(45) Date of Patent: Sep. 27, 2016

(54) OVERFLOW DOWN-DRAW WITH IMPROVED GLASS MELT VELOCITY AND THICKNESS DISTRIBUTION

(71) Applicant: CORNING INCORPORATED, Corning, NY (US)

(72) Inventors: Steven Michael Milillo, State College, PA (US); Randy Lee Rhoads, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/624,686

(22) Filed: Feb. 18, 2015

(65) Prior Publication Data

US 2015/0158753 A1    Jun. 11, 2015

Related U.S. Application Data

(63) Continuation of application No. 13/279,847, filed on Oct. 24, 2011, now Pat. No. 8,973,402.

(60) Provisional application No. 61/407,963, filed on Oct. 29, 2010.

(51) Int. Cl.
  *C03B 17/06* (2006.01)
  *C03B 7/02* (2006.01)

(52) U.S. Cl.
  CPC ............ *C03B 17/064* (2013.01); *C03B 7/02* (2013.01); *Y02P 40/57* (2015.11)

(58) Field of Classification Search
  CPC ............................. C03B 17/064; C03B 7/02
  See application file for complete search history.

(56) References Cited

U.S. PATENT DOCUMENTS

| | | | |
|---|---|---|---|
| 2,263,493 A | 11/1941 | Habert | |
| 3,338,696 A | 8/1967 | Dockerty | 65/145 |
| 6,748,765 B2 | 6/2004 | Pitbladdo | 65/53 |
| 6,990,834 B2 | 1/2006 | Pitbladdo | 65/29.21 |
| 6,997,017 B2 | 2/2006 | Pitbladdo | 65/53 |
| 2001/0039814 A1 | 11/2001 | Pitbladdo | 65/193 |
| 2005/0183455 A1 | 8/2005 | Pitbladdo | 65/90 |
| 2006/0016219 A1 | 1/2006 | Pitbladdo | 65/29.21 |
| 2007/0068197 A1 | 3/2007 | Pitbladdo | 65/90 |
| 2007/0144210 A1 | 6/2007 | Pitbladdo | 65/90 |

(Continued)

FOREIGN PATENT DOCUMENTS

| | | |
|---|---|---|
| CN | 1537081 | 10/2004 |
| CN | 100361912 C | 1/2008 |

(Continued)

OTHER PUBLICATIONS

Machine Translation CN1537081.

(Continued)

*Primary Examiner* — Queenie Dehghan
(74) *Attorney, Agent, or Firm* — Ryan T. Hardee

(57) ABSTRACT

An apparatus for making a glass sheet using overflow fusion down-draw process comprising an inlet assembly having an elliptic cylindrical section coupled to a transition section which is, in turn, coupled to an open end of an open channel of an isopipe, and an overflow fusion down-draw process for making glass sheet. The glass melt flow has a high surface velocity profile conducive to the formation of a glass ribbon over the surface of the weirs and the wedge side surfaces with the desired mass distribution.

10 Claims, 5 Drawing Sheets

(56) References Cited

U.S. PATENT DOCUMENTS

| | | | |
|---|---|---|---|
| 2008/0034798 A1 | 2/2008 | Bergman et al. | 64/90 |
| 2010/0269545 A1 | 10/2010 | Boratav et al. | 65/128 |

FOREIGN PATENT DOCUMENTS

| | | | | |
|---|---|---|---|---|
| CN | 202430108 | 9/2012 | | |
| JP | S42-1967-23356 | 11/1942 | | |
| JP | 2006-298736 | 11/2006 | | |
| TW | 200829527 A | 7/2008 | | |
| WO | WO03/014032 | 2/2003 | ............. | C03B 17/06 |
| WO | WO03055813 | 7/2003 | ............. | C03B 17/06 |
| WO | WO2005035454 | 4/2005 | ............. | C03B 17/06 |
| WO | WO2005/081888 | 9/2005 | | |
| WO | WO2005/121035 | 12/2005 | ............. | C03B 17/06 |
| WO | WO2007/070825 | 6/2007 | ................ | C03B 5/26 |

OTHER PUBLICATIONS

Machine Translation CN202430108.
Machine Translation JP2006-298736.
CN201110358520.6 Search Report.

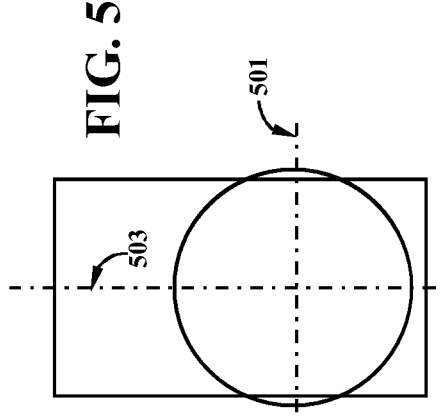
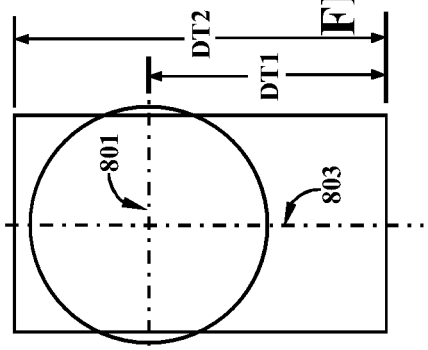# 
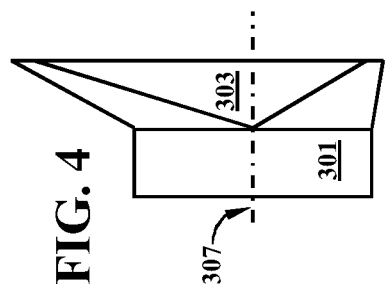
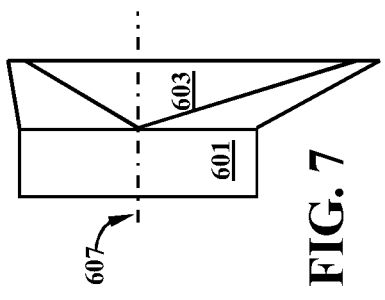
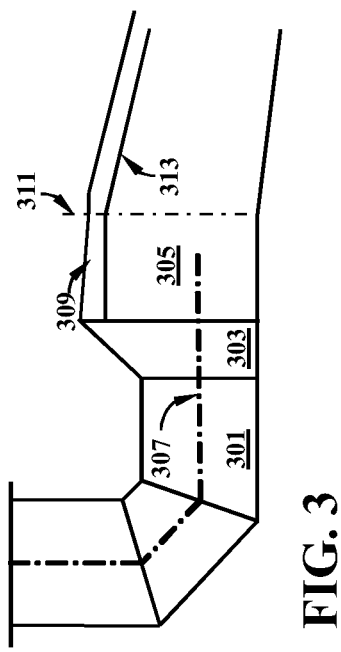
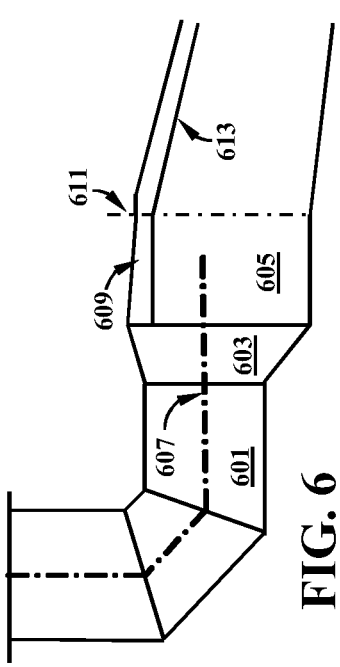

OVERFLOW DOWN-DRAW WITH IMPROVED GLASS MELT VELOCITY AND THICKNESS DISTRIBUTION

This subject application is a continuation and claims the benefit of priority to U.S. application Ser. No. 13/279,847 filed Oct. 24, 2011 and to U.S. Provisional Application No. 61/407,963 filed on Oct. 29, 2010 the content of which is relied upon and incorporated herein by reference.

TECHNICAL FIELD

The present invention relates in general to glass sheet-making equipment and method. In particular, the present invention relates to method and apparatus for forming a glass sheet using an overflow fusion down-draw process. The present invention is useful, e.g., in making glass sheet suitable for LCD glass substrates using an overflow down-draw process.

BACKGROUND

Fusion down-draw is a leading technology developed by Corning Incorporated, Corning, N.Y., U.S.A. for making thin, precision glass sheets suitable for use as liquid crystal display (LCD) glass substrates and in other opto-electronic devices. This process is schematically illustrated in FIG. 1. A stream of molten glass is introduced into a forming trough 103 called isopipe with end-caps 105 at both ends and having two side surfaces converging at a line called root 109 via an inlet pipe 101 coupled to the trough of the isopipe. The glass melt is allowed to flow over both top surfaces of the trough side walls of the isopipe called weirs, down along both side surfaces of the isopipe as two molten glass ribbons 107, and then join and fuse at the root 109 to form a single glass ribbon 111, which is then drawn down in the direction 113 and cooled below the root to form the glass sheet with desired dimension. In the zone below the root, the glass ribbon travels substantially vertically downward while being drawn and cooled from a viscous state, to visco-elastic and eventually to substantially elastic. The elastic glass ribbon is then cut into individual glass sheets, subjected to further finishing such as edge rounding and polishing, and then packaged and shipped to LCD panel makers for use as TFT or color filter substrates. Cutting of the glass ribbon at below the isopipe typically involves the scoring of the ribbon surface, followed by bending along the score-line, whereby discrete glass sheets are separated from the ribbon and then transferred to subsequent steps.

One of the advantages of the fusion down-draw process for making glass sheets is that the surface quality of the glass sheets is high because the quality areas thereof were formed in an atmosphere and never touched a solid material such as the forming equipment. This process has been used successfully for making glass sheets having a width as large as 3000 mm and a thickness of about 0.6 mm.

The size of LCDs for the consumer electronics market has grown steadily in the past decade, and along with a corresponding demand for higher image quality. These have fueled the demand of large-width glass substrates and posed increasingly more stringent requirements for glass sheet quality, such as edge warp and waviness, sheet warp, surface waviness and roughness, thickness uniformity, mura, as well as stress. In addition, consumers have demonstrated interest in lighter electronics, which call for thinner glass substrates having a thickness of 500 µm, 400 µm, 300 µm or even lower.

Making large-size and/or thin glass sheets using the fusion down-draw is no easy undertaking, requiring the use of new generations of isopipes having significantly larger length. Over the years, experts such as the present inventors have gained insights into the many process parameters that can impact the process stability during the forming process. Particularly, it was found that the formation of a stable, thin glass ribbon over the large width of a large-generation isopipe may not be achieved reliably in a relatively short period of time within an economical process widow having a desirable yield without proper glass melt flow velocity which can be quite different from the flow velocity for smaller isopipes.

Therefore, there remains a need of an apparatus and method for making glass sheets having a large size. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

A first aspect of the present invention relates to a process for making a glass sheet by an overflow process using a forming body comprising a trough-shaped part and a wedge-shaped part below the trough-shaped part, the trough-shaped part having a first trough side wall and a second trough side wall over a trough bottom surface defining an open channel having an open end, the open channel having a center plane, the first trough side wall having a first internal trough surface, a first trough top surface and a first external trough side surface, the second trough side wall having a second internal trough surface, a second trough top surface and a second external trough side surface, the wedge-shaped part having a first wedge side surface connecting with the first external trough side surface, and a second wedge side surface connecting with the second external trough side surface, the first and second wedge side surfaces sloping downwardly to join at a root line, the method comprising:

(i) delivering a stream of a molten glass via a closed channel into the open channel of the trough-shaped part through the open end of the open channel;

(ii) allowing the molten glass to flow over at least part of the first trough top surface, down along the first external trough side surface to form a first glass ribbon over the first external trough side surface; and (iii) allowing the molten glass to flow over at least part of the second trough top surface, down along the second external trough side surface to form a second glass ribbon over the second external trough side surface; wherein in step (i), the closed channel and the open channel are arranged such that the velocity distribution of the stream of the molten glass in a vertical reference plane tangential to the center plane of the open channel at a point where overflow starts on the first trough top surface is such that the average velocity of the molten glass in the top one fourth is higher than the average velocity in the bottom one fourth immediately above the trough bottom surface.

In certain embodiments of the process of the first aspect of the present invention, the closed channel and the open channel are arranged such that the average velocity of the molten glass in the top one third is higher than the average velocity in the bottom one third immediately above the trough bottom surface.

In certain embodiments of the process of the first aspect of the present invention, the closed channel and the open channel are arranged such that the average velocity of the molten glass in the top one half is higher than the average velocity in the bottom one half immediately above the trough bottom surface.

In certain embodiments of the process of the first aspect of the present invention, the process further comprises, subsequent to steps (ii) and (iii), a step (iv), a step (v) and a step (vi) as follows:

(iv) allowing the first glass ribbon to further flow over the first wedge side surface of the wedge-shaped part;

(v) allowing the second glass ribbon to further flow over the second wedge side surface of the wedge-shaped part; and (vi) allowing the first glass ribbon and the second glass ribbon to join at the root line to form a single, third glass ribbon.

In certain embodiments of the process of the first aspect of the present invention, the process further comprises, subsequent to step (vi), a step (vii) as follows:

(vii) drawing the third glass ribbon below the root line.

In certain embodiments of the process of the first aspect of the present invention, steps (ii) and (iii) are carried out simultaneously.

In certain embodiments of the process of the first aspect of the present invention, steps (iv) and (v) are carried out simultaneously.

In certain embodiments of the process of the first aspect of the present invention, the center plane of the open channel is planar, and the open channel is symmetrical with respect to the center plane.

In certain embodiments of the process of the first aspect of the present invention, the trough-shaped part is symmetrical with respect to the center plane of the open channel.

In certain embodiments of the process of the first aspect of the present invention, the wedge-shaped part is symmetrical with respect to the center plane of the open channel.

In certain embodiments of the process of the first aspect of the present invention, the trough-shaped part and the wedge-shaped part are symmetrical with respect to the center plane of the open channel, and the center plane is parallel to the gravity vector.

In certain embodiments of the process of the first aspect of the present invention, the trough-shaped part and the wedge-shaped part are symmetrical with respect to a plane passing through the root line.

In certain embodiments of the process of the first aspect of the present invention, the first top trough surface and the second trough top surface are planar and parallel to each other.

In certain embodiments of the process of the first aspect of the present invention, each of the first and second trough top surfaces independently forms an angle alpha with respect to the center plane, same or different, wherein $75° \leq alpha \leq 90°$, in certain embodiments $78° \leq alpha \leq 90°$, in certain embodiments $80° \leq alpha \leq 90°$, in certain embodiments $82° \leq alpha \leq 90°$, in certain embodiments $84° \leq alpha \leq 90°$, in certain embodiments $85° \leq alpha \leq 90°$, in certain other embodiments $88° \leq alpha \leq 90°$.

In certain embodiments of the process of the first aspect of the present invention, the longitudinal axes of the first and second trough top surfaces lie in a common plane, which intersects a reference plane perpendicular to the center plane of the open channel to form an angle gamma, wherein $0° \leq gamma \leq 15°$, in certain embodiments $0° \leq gamma \leq 12°$, in certain embodiments $0° \leq gamma \leq 10°$, in certain embodiments $0° \leq gamma \leq 8°$, in certain embodiments $0° \leq gamma \leq 6°$, in certain embodiments $0° \leq gamma \leq 5°$, in certain embodiments $0° \leq gamma \leq 3°$. The angle gamma is the downward or upward sloping angle of the first and second trough top surfaces with respect to a horizontal plane (the reference plane) when the isopipe is placed such that the center plane 199 is parallel to the gravity vector. It has been found that the present invention is particularly advantageous for quickly establishing a consistent glass flow on both sides of the isopipe if the trough top surfaces slope downwardly with a small angle gamma.

In certain embodiments of the process of the first aspect of the present invention, the trough bottom surface slopes upward from one end to the other end when the root line is held essentially perpendicular to the gravity vector.

In certain embodiments of the process of the first aspect of the present invention, the trough bottom surface slopes upward from the open end of the channel to the other end of the channel when the root line is held essentially perpendicular to the gravity vector.

In certain embodiments of the process of the first aspect of the present invention, the trough bottom surface is essentially planar.

In certain embodiments of the process of the first aspect of the present invention, the trough bottom surface slopes upwards from the proximal end to the distal end of the open channel, and intersects with a reference plane perpendicular to the center plane of the open channel to form an angle beta, wherein $0° \leq beta \leq 10°$, in certain embodiments $0° \leq beta \leq 80°$, in certain embodiments $0° \leq beta \leq 5°$, in certain other embodiments $0° \leq beta \leq 3°$.

In certain embodiments of the process of the first aspect of the present invention, the trough bottom surface slopes downwards from the proximal end to the distal end of the open channel, and intersects with a reference plane perpendicular to the center plane of the open channel to form an angle beta2, wherein $0° \leq beta2 \leq 10°$, in certain embodiments $0° \leq beta2 \leq 8°$, in certain embodiments $0° \leq beta2 \leq 5°$, in certain other embodiments $0° \leq beta2 \leq 3°$ In certain embodiments of the process of the first aspect of the present invention, the open channel has a length LL from one end to the other, and a rectangular cross-section when intersected by a plane parallel to the gravity vector and perpendicular to the center plane, said cross-section having a width WW and a height HH.

In certain embodiments of the process of the first aspect of the present invention, $LL \geq 1200$ mm, in certain embodiments $LL \geq 1500$ mm, in certain embodiments $LL \geq 2000$ mm, in certain embodiments $LL \geq 2500$ mm, in certain other embodiments $LL \geq 3000$ mm.

In certain embodiments of the process of the first aspect of the present invention, the closed channel connecting with the trough-shaped part comprises:

(A) a first part having a cross-section when intersected by a plane perpendicular to the center plane of the open channel having a first axis parallel to the gravity vector, and a second axis perpendicular to the gravity vector; and (B) a second transition closed channel fittingly connecting the first part with the open channel of the trough-shaped part.

In certain embodiments of the process of the first aspect of the present invention, the second axis of the first part is larger than the width WW(IE) of a cross-section of the open channel of the trough-shaped part at the end of the open channel connecting with the second transition closed channel.

In certain embodiments of the process of the first aspect of the present invention, the ratio of WW(IEh) to the length of the second axis of the first part is from 0.5 to 0.95, in certain embodiments from 0.6 to 0.9, in certain embodiments from 0.6 to 0.8, in certain other embodiments from 0.6 to 0.7.

In certain embodiments of the process of the first aspect of the present invention, the first axis of the first part is smaller than the height HH(IE) of the rectangular cross-section of the open channel of the trough-shaped part at the end of the open channel connecting with the second transition closed channel.

In certain embodiments of the process of the first aspect of the present invention, the ratio of the first axis of the cross-section of the first part to HH(IE) is from 0.5 to 0.95, in certain embodiments from 0.6 to 0.9, in certain embodiments from 0.6 to 0.8, in certain other embodiments from 0.6 to 0.7.

In certain embodiments of the process of the first aspect of the present invention, the ratio of the first axis to the second axis of the first part ranges from 1.0 to 3.0, in certain embodiments from 1.2 to 2.8, in certain other embodiments from 1.5 to 2.5, in certain other embodiments from 1.7 to 2.1.

In certain embodiments of the process of the first aspect of the present invention, the second transition closed channel is symmetrical with respect to the center plane of the open channel of the trough-shaped part.

In certain embodiments of the process of the first aspect of the present invention, at least part of the first part is symmetrical with respect to the center plane of the open channel of the trough-shaped part.

In certain embodiments of the process of the first aspect of the present invention, the distance from the center of the cross-section of the end of the first part connecting with an end of the second transition closed channel to a plane perpendicular to the gravity vector and tangential to a bottom line of the open end of the open channel is DT1; the distance from the free surface of the molten glass abutting the end of the open channel to the plane perpendicular to the gravity vector and tangential to a bottom line of the open end of the open channel is DT2; and DT1/DT2≥0.50; in certain embodiments DT1/DT2≥0.60; in certain embodiments DT1/DT2≥0.70; in certain embodiments DT1/DT2≥0.80; in certain embodiments DT1/DT2≥0.90.

In certain embodiments of the process of the first aspect of the present invention, the cross-section of the first part is elliptical.

In certain embodiments of the process of the first aspect of the present invention, the ratio of the first axis to the second axis of the first part ranges from 1.0 to 3.0, in certain embodiments from 1.2 to 2.8, in certain other embodiments from 1.5 to 2.5, in certain other embodiments from 1.7 to 2.1.

In certain embodiments of the process of the first aspect of the present invention, the velocity distribution of the stream of molten glass immediately before exiting the end of the first part is symmetrical with respect to the center plane of the open channel.

In certain embodiments of the process of the first aspect of the present invention, the velocity distribution of the stream of molten glass immediately before existing the end of the first part is symmetrical with respect to a plane perpendicular to the gravity vector and passing through the second axis of the cross-section of the first part.

A second aspect of the present invention is directed to an apparatus for making a glass sheet comprising:

(a) a forming body comprising a trough-shaped part over a wedge-shaped part, the trough-shaped part having a first trough side wall and a second trough side wall over a trough bottom surface defining an open channel having art open end, the open channel having a center plane, the first trough side wall having a first internal trough surface, a first trough top surface and a first external trough side surface, the second trough side wall having a second internal trough surface, a second trough top surface and a second external trough side surface, the wedge-shaped part having a first wedge side surface connecting with the first external trough side surface, a second wedge side surface connecting with the second external trough side surface, the first and second wedge side surfaces sloping downwardly to join at a root line; and (b) a tube defining a closed channel connecting with the open channel of the trough-shaped part through the open end of the open channel, the tube comprising:

(b1) a first part having a cross-section when intersected by a plane perpendicular to the center plane having a first axis parallel to the gravity vector if the center plane is parallel to the gravity vector, and a second axis perpendicular to the first axis; and (b2) a second transition closed channel fittingly connecting the first part with the open channel of the trough-shaped part;

wherein:

the distance from the center of the cross-section of the end of the first part connecting with an end of the second transition closed channel to a plane perpendicular to the first axis and tangential to a bottom line of the open end of the open channel is DT1;

the distance from the first trough top surface at the end of the open channel to the plane perpendicular to the first axis and tangential to a bottom line of the open end of the open channel is DT2; and DT1/DT2≥0.50; in certain embodiments DT1/DT2≥0.60; in certain embodiments DT1/DT2≥0.70; in certain embodiments DT1/DT2≥0.80; in certain embodiments DT1/DT2≥0.90.

In certain embodiments of the apparatus of the second aspect of the present invention, the cross-section of the first part is elliptical.

In certain embodiments of the apparatus of the second aspect of the present invention, the ratio of the first axis to the second axis of the first part ranges from 1.0 to 3.0, in certain embodiments from 1.2 to 2.8, in certain other embodiments from 1.5 to 2.5, in certain other embodiments from 1.7 to 2.1.

In certain embodiments of the apparatus of the second aspect of the present invention, the first part of the tube defining the closed channel has a cylindrical cross-section when intersected by a plane perpendicular to the root line.

In certain embodiments of the apparatus of the second aspect of the present invention, the root line is perpendicular to the gravity vector.

In certain embodiments of the apparatus of the second aspect of the present invention, the second axis of the first part is larger than the width WW(IE) of a cross-section of the open channel of the trough-shaped part at the end of the open channel connecting with the second transition closed channel.

In certain embodiments of the apparatus of the second aspect of the present invention, the ratio of WW(IE) to the length of the second axis of the first part is from 0.5 to 0.95, in certain embodiments from 0.6 to 0.9, in certain embodiments from 0.6 to 0.8, in certain other embodiments from 0.6 to 0.7.

In certain embodiments of the apparatus of the second aspect of the present invention, the first axis of the first part is smaller than the height HH(IE) of the cross-section of the open channel of the trough-shaped part at the end of the open channel connecting with the second transition closed channel.

In certain embodiments of the apparatus of the second aspect of the present invention, the ratio of the first axis to HH(IE) is from 0.5 to 0.95, in certain embodiments from 0.6 to 0.9, in certain embodiments from 0.6 to 0.8, in certain other embodiments from 0.6 to 0.7.

In certain embodiments of the apparatus of the second aspect of the present invention, the second transition closed channel is symmetrical with respect to the center plane of the open channel of the trough-shaped part.

In certain embodiments of the apparatus of the second aspect of the present invention, at least part of the first part is symmetrical with respect to the center plane of the open channel of the trough-shaped part.

In certain embodiments of the process of the first aspect of the present invention, the open channel of the trough-shaped part of the isopipe has a length LL from one end to the other, wherein LL≥1200 mm, in certain embodiments LL≥1500 mm, in certain embodiments LL≥2000 mm, in certain embodiments LL≥2500 mm, in certain other embodiments LL≥3000 mm.

One or more embodiments and/or aspects of the present disclosure have one or more of the following advantages. First, the closed channel design of the glass inlet pipe allows for a glass melt velocity profile having a higher average velocity in the vicinity of the surface than an average velocity in the vicinity of the bottom, resulting in reliable formation of a glass ribbon over the entire weir top surfaces and side surfaces. Second, the higher surface velocity, especially in the vicinity of the overflow starting position, resulting from the closed channel design of the invention allows for the formation of a glass ribbon over the weir surfaces and side surfaces with a more desired mass distribution along the length of the weirs suitable for making a glass sheet with high thickness uniformity by the overflow fusion down-draw process. Third, the apparatus and the method of the present invention can be particularly advantageous for making large-size glass sheets having a width of at least 2000 mm, especially those with a width of at least 3000 mm. The inverted design of the present invention can be used to replace previous equipment without taking up significant amount additional space, making retrofitting relatively easy.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings:

FIG. 3 is a schematic drawing showing a closed channel coupled with an isopipe at the inlet end.

FIG. 4 is a schematic drawing showing a side view of part of the closed channel shown in FIG. 3.

FIG. 5 is a schematic drawing showing the end view of the closed channel shown in FIG. 3.

FIG. 6 is a schematic drawing showing a closed channel coupled with an isopipe at the inlet end in a manner different from that of FIG. 3.

FIG. 7 is a schematic drawing showing a side view of part of the closed channel shown in FIG. 6.

FIG. 8 is a schematic drawing showing the end view of the closed channel shown in FIG. 6.

DETAILED DESCRIPTION

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a side surface" includes embodiments having one, two or more such side surfaces, unless the context clearly indicates otherwise.

The overflow down-draw process for making a sheet glass is described in WO03/014032, WO05/081888, and the like, the relevant contents thereof are incorporated herein by reference in their entirety.

Figure 2:
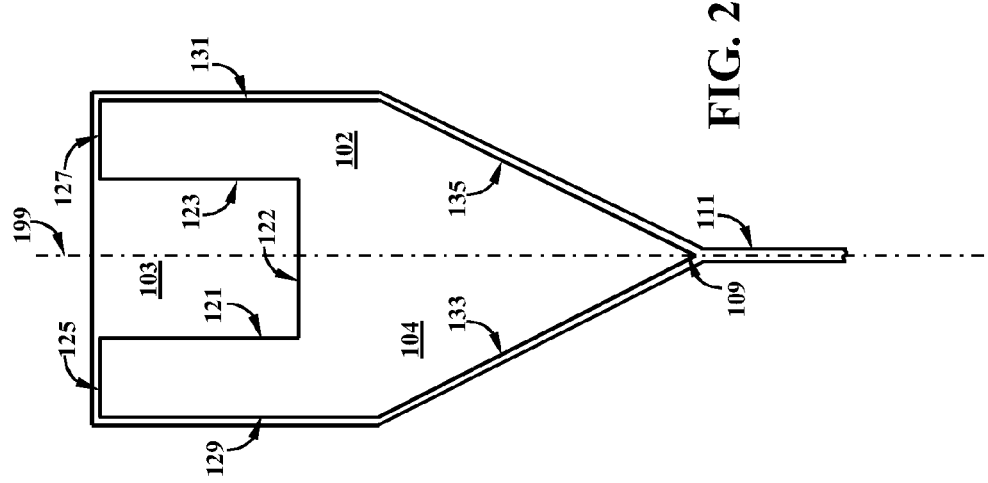
FIG. 2 is a schematic drawing showing a cross-section of the isopipe illustrated in FIG. 1.
Figure 1:
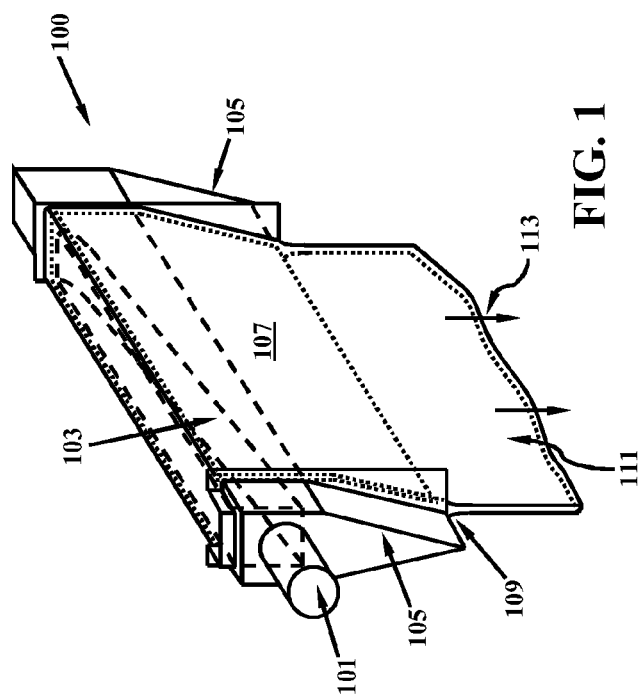
FIG. 1 is a schematic drawing showing an isopipe operating in an overflow fusion down-draw process for making a glass ribbon.

FIGS. 1 and 2 schematically illustrate an isopipe assembly 100 during normal operation. The isopipe comprises an upper trough-shaped part 102 and a lower wedge-shaped part 104, which, in combination, form a unitary forming body 100. The trough-shaped part comprises a first trough side wall having a first internal trough side surface 121, a second trough side wall having a second internal trough side surface 123, and a trough bottom surface 122, which together define an open channel (also called "trough") 103 into which glass melt is introduced, typically through an open end thereof. The glass melt is allowed to flow over the first trough top surface 125 of the first trough wall and the second trough top surface 127 of the second trough wall as two separate glass ribbons, down along a first external trough side surface 129 and a second external trough side surface 131, and further down along a sloping first wedge side surface 133 connecting with the first external trough side surface 129, and a sloping second wedge side surface 135 connecting with the second external trough side surface 131. At the root 109 where the two wedge side surfaces 133 and 135 join, the two glass ribbons fuse to form a unitary glass ribbon 111, which is further drawn down in the direction 113 to a desired thickness, cooled down to elastic state, and then cut into individual glass sheet pieces with desired size. For the purpose of convenient description, a virtual plane 199 having the smallest cumulative difference in distances to (I) the first internal trough side surface 121 of the first trough wall and to (II) the second internal trough side surface 123 of the second trough wall is defined as the center plane of the open channel (trough) 103. Thus, if the open channel 103 is symmetrical with respect to a plane passing the centerline, the center plane 199 would be the plane with respect to which the two sides of the open channel 103 are symmetrical. Desirably, both the trough-shaped part and the wedge-shaped part are symmetrical with respect to the center plane 199 of the open channel. In such scenario, the center plane 199 would also pass the root line 109 of the isopipe.

In a desired process, the glass melt should overflow the first and second trough top surfaces 125 and 127 and cover them continuously to form a smooth and continuous glass ribbon. Likewise, the glass ribbons flowing down the external side surfaces 129, 131, 133, 135 of the isopipe should desirably cover the entire side surfaces (subject to physical restrictions by other isopipe accessories, such as the end-caps and edge directors, and the like) without significant thickness variation from one end of the isopipe to the other, except in the end sections where larger or smaller thicknesses than the middle may be accepted. Desirably, the glass melt flow in the two ribbons is consistent over an extended period of time so that a glass sheet can be reliably produced at the bottom or the draw. At the beginning of a forming campaign, it may take some time for the glass flows to establish full, stable and consistent ribbons with desirable thickness and flow rate. To increase the overall yield of the glass during a full campaign, it is highly desirable that the initial period required to establish such stable glass ribbons be as short as possible. The flow rate and distribution thereof of the glass melt along the full length of the first and second trough top surfaces affect the thickness and thickness variation of the final glass sheet to be produced at the bottom of the draw.

As shown in FIG. 2, the isopipe trough 103 in this embodiment has a rectangular cross-section when intersected by a plane substantially perpendicular to the longitudinal axis thereof. Thus, the trough side walls are substantially vertical and the bottom surface of the trough is substantially planar at least partly. The trough, and the isopipe have an open, proximal end through which glass melt is introduced into the trough through an inlet tube typically in the form of a closed channel coupled with the open end of the trough, and a distal end which is typically closed.

In the past, when smaller generation isopipes having a length of less than 2000 mm were used to make glass sheets having a relatively small sheet width, the coupling of the inlet tube typically takes the form as illustrated in FIGS. 3, 4 and 5. The inlet tube typically has a cylindrical section 301 with a center axis 307 and a transition part 303 having a circular end 305 welded to end of the cylindrical section 301, and a rectangular end coupled to the rectangular open end of the trough. The glass melt, once it fills the trough completely, will flow over the top trough surface 313, establish a stream of glass melt having a top free surface 309 due to the overall head of the glass melt as provided by the upstream process. This inlet coupling design results in a glass melt velocity profile that can satisfy the needs of manufacture of glass sheets with a width of less than 2000 mm.

Recently, the present inventors found that the conventional design of FIGS. 3, 4 and 5 do not meet the needs of forming glass sheets using isopipes having a length of over 3000 mm. Continuous and consistent glass ribbons were difficult to establish over the trough side wall top surfaces and the side surfaces of the isopipe for the purpose of making a glass sheet below the isopipe having a thickness and thickness variation profile meeting the requirements. An inlet pipe re-design was required.

Surprisingly, the present inventors found that by using an inlet pipe design having a closed channel illustrated in FIGS. 6, 7 and 8, stable, consistent and reliable glass ribbons can be established over a long isopipe having a length of over 3000 mm, and the speed of establishing a stable forming process was quite acceptable. Because this inlet pipe coupling design is substantially an inverted version of what is illustrated in FIGS. 3, 4 and 5, it is sometimes called "inverted inlet design."

In-depth study, including mathematical modeling and simulation, oil modeling using oil having rheological properties similar to the glass melt to be handled during normal operation, found that the inverted design of FIGS. 6, 7 and 8 resulted in a significantly different glass melt velocity distribution from that of FIGS. 3, 4 and 5, which is particularly beneficial for quickly establishing a glass ribbon over the isopipe surfaces. Specifically, a salient and desirable trait of the glass melt flow is: the velocity distribution of the stream of the molten glass in a vertical plane tangential to the center plane of the open channel at a point where overflow starts on the first and second trough top surfaces is such that the velocity of the molten glass in the top one fourth from the free surface is higher than the velocity of the molten glass in the bottom one fourth immediately above the trough bottom surface. The higher velocity at the top portion, especially the free surface of the glass melt than in the bottom region was found to be particularly beneficial for the quick establishment of a stable and continuous glass flow over the trough side top surfaces and the side surfaces of the isopipe with desirable mass distribution satisfying the needs of manufacture of a glass sheet for LCD substrates. The present inventors believe that while this velocity distribution is particularly advantageous for large-size isopipes and may be required for those having a length of over 3000 mm, it can be advantageously applied to smaller generation isopipes, such as those having a length of below 3000 mm, especially those having a significant length of at least 2000 mm.

In certain embodiments of the process of the present invention, it is highly desired that the glass ribbon flowing downward on the two side surfaces 129, 131 of the trough-shaped part and the two sides surfaces 133, 135 of the wedge-shaped part are substantially symmetrical, i.e., they have substantially the same width from one end of the isopipe to the other, and substantially the same thickness distribution from the top side wall surfaces to the root of the isopipe. The glass ribbons may have different thickness from the top to the bottom of the isopipe at each side as the temperature and viscosity of the glass melt changes from the top to the bottom. When the two glass ribbons flowing down along the two side surfaces join at the root, the inner surfaces contacting the side surfaces of the isopipe fused into the bulk of the glass ribbon which is drawn down below the isopipe, leaving the two external surfaces of the glass ribbons to be continue to be exposed to the air and without contact any solid surface, thereby preserving a pristine surface quality, which will be carried into the end glass sheet products.

Needless to say, to establish substantially symmetrical glass ribbons over the side surfaces 129, 131, 133 and 135 as discussed supra, the flow of glass melt over the weir surfaces of the isopipe (i.e., the first trough top surface and the second trough top surface) and along the side surfaces 129, 131, 133 and 135 need to take place substantially simultaneously, and with substantially the same velocity profile. To that end, it is highly desired that all of the following are symmetrical with respect to the center plane 199 of the open channel of the trough 103: (i) the open channel of the trough 103; (ii) the first and second internal trough side surfaces 121 and 123; (iii) the first and second external trough side surfaces 129 and 131; and (iv) the first and second wedge side surfaces 133 and 135 of the wedge-shaped part. In these embodiments, it is desired that the influence of external forces, such as gravity, to the shape and geometry change of the isopipe, and to the flow of the glass melt along both sides of the isopipe, be symmetrical as well. To that end, it is desired that the isopipe be placed in a manner such that the center plane 199 of the open channel be parallel to the gravity vector, and that root line is within the center plane 199.

The first and second trough top surfaces 125 and 127 may be substantially planar, even though curved surfaces may be used. Likewise, side surfaces 129, 131, 133 and 135 may be substantially planar, even though curved surfaces may be used as well. The first and second trough top surfaces 125 and 127 may be substantially perpendicular to the center plane 199, or form an angle alpha with respect to the same reference plane. Nonetheless, it is desired that wherein 0°≤alpha≤10°, in certain embodiments 82°≤alpha≤90°, in certain embodiments 84°≤alpha≤90°, in certain embodiments 85°≤alpha≤90°. The longitudinal axes of the first and second trough top surfaces 125 and 127 desirably lie in a common plane, which intersects a reference plane perpendicular to the center plane 199 of the open channel to form an angle gamma, where 0°≤gamma≤10°, in certain embodiments alpha 0°≤gamma≤8°, in certain embodiments 0°≤gamma≤6°, in certain embodiments 0°≤gamma≤5°, in certain embodiments 0°≤gamma≤3°. The angle gamma is the downward sloping angle of first and second trough top surfaces with respect to a horizontal plane (the reference plane) when the isopipe is placed such that the center plane 199 is parallel to the gravity vector. It has been found that the present invention is particularly advantageous for quickly establishing a stable and consistent glass flow on both sides of the isopipe if the trough top surfaces slope downwardly with a small angle gamma.

The trough bottom surface 122 can be a flat plane or a curved plane. Regardless, in order to achieve symmetrical glass flow on both sides of the isopipe, it is highly desired that the trough bottom surface 122 be substantially symmetrical with respect to the center lane 199 of the open channel 103 as well. The trough bottom surface 122 can be planar or curved from one side wall to the other, and can be planar or curved from one end of the channel to the other. In one particularly advantageous embodiment illustrated in FIG. 1, the trough bottom surface 122 slopes upwards from the proximal end (inlet end) to the distal end, thus intersecting a reference plane perpendicular to the center plane 199 to form an angle beta. It is desired that 0°≤beta≤10°, in certain embodiments 0°≤beta≤80°, in certain embodiments 0°≤beta≤5°, in certain embodiments 0°≤beta≤3°. In another embodiment, as illustrated in FIGS. 3 and 6, the trough bottom surface 122 slopes downwardly from the proximal end to the distal end, thus intersecting a reference plane perpendicular to the center plane 199 to form an angel beta2. It is desired that 0°≤beta2≤10°, in certain embodiments 0°≤beta2≤8°, in certain embodiments 0°≤beta2≤6°, in certain embodiments 0°≤beta2≤5°. If the first and second trough top surfaces slope downwardly from the proximal end to the distal end, it is desired that the bottom surface 122 slopes downwardly from the proximal end to the distal end as well, so that a stable and consistent flow can be established relatively fast on both sides of the isopipe.

Thus, the open channel 103 of the isopipe can have a length LL from the proximal end to the distal end, and a rectangular cross-section when intersected by a reference plane perpendicular to the center plane 199. The cross-section can have a height HH in the direction of the gravity vector when the center plane 199 is placed to be parallel to the gravity vector, and a width WW. As described supra, the present invention is particularly advantageous for use with isopipes having a long length suitable for making large size glass sheets. For example, it is advantageous that in certain embodiments of the process of the present invention, LL≥2000 mm, in certain embodiments LL≥2500 mm, in certain other embodiments LL≥3000 mm. As mentioned supra, the present invention process may be advantageously used for isopipes having an LL less than 2000 mm as well.

Figure 9:
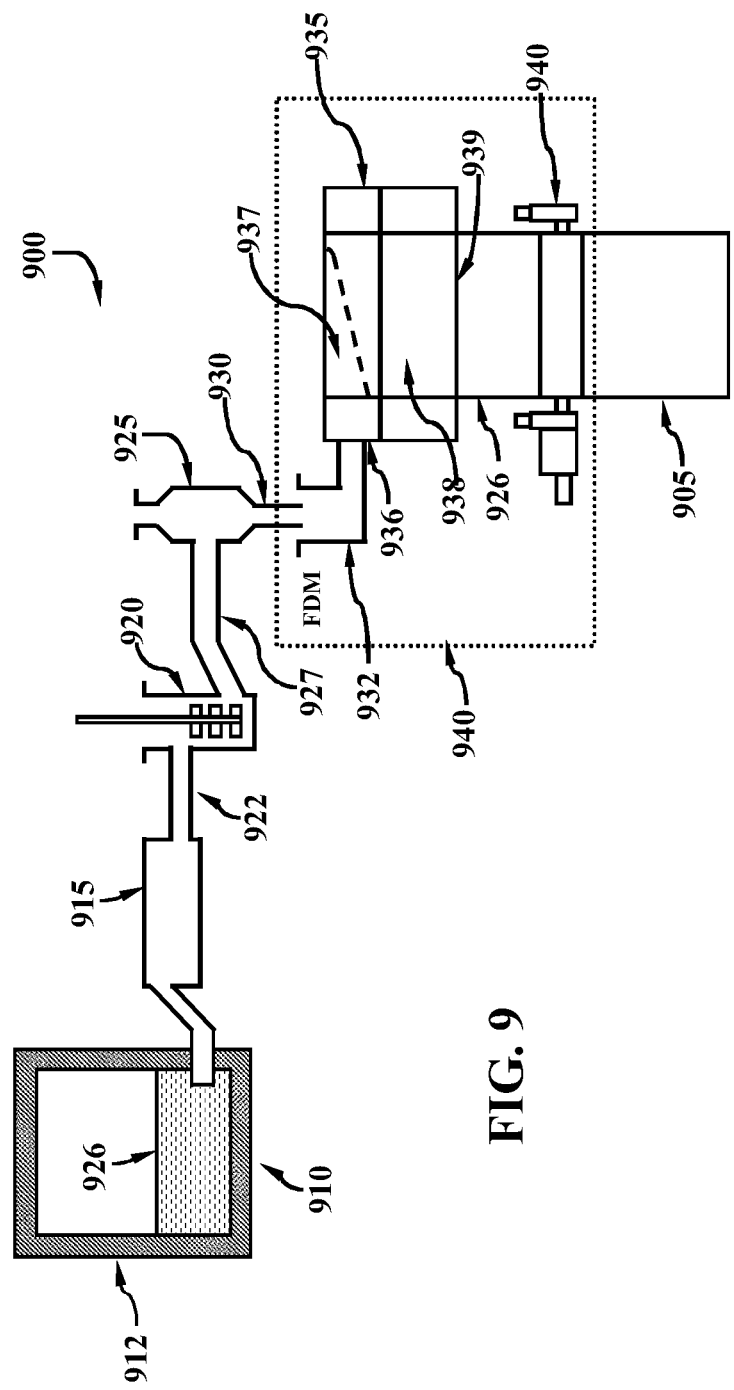
FIG. 9 is a schematic illustration of a sheet glass-making system using an overflow down-draw process.

In a glass sheet-making system 900 schematically illustrated in FIG. 9 involving using overflow fusion down-draw forming, a glass melt 926 is typically formed by melting raw materials 912 in a glass melting tank 910, which is then conditioned to reduce or remove inhomogeneous portions such as cord and gas bubbles, e.g., in a finer tube 915 and a stirrer 920 connected by a tube 922. The glass melt is then delivered through a channel 927 to a bowl 925, then through a down-comer tube 930 into an inlet tube assembly 932 comprising a vertical part and a horizontal part. The horizontal part 936 is coupled to the open end of the open channel 937 at the proximal end of an isopipe. Once the glass melt fills the open channel, it is allowed to flow over both side walls (called weirs) of the open channel 937, down along the side surfaces of the isopipe as two glass ribbons 938, which join at the root 939 of the isopipe to form a unitary glass ribbon 926, which is then drawn down by, e.g., pulling rolls 940 inside the fusion draw machine (FDM) 940, and cooled down to an elastic glass ribbon 905, which will be subsequently cut into separate glass sheets.

The present invention involves the improvement to the horizontal part of the inlet tube assembly. As mentioned supra, FIGS. 3, 4 and 5 schematically illustrate the set-up of an inlet tube assembly used previously for smaller generation isopipes, such as those having a LL less than 2000 mm. the horizontal part of the inlet tube assembly comprises an elliptic cylindrical part 301 having a first axis in the direction of the vertical line 503, which is typically parallel to the gravity vector, and a second axis in the direction of a the horizontal line 501. The horizontal part of the inlet tube assembly further comprises a transition part 303 coupling the elliptic cylindrical part 301 to the open end of the open channel 305. Thus, the transition part comprises an elliptic cylindrical end fittingly connected to the end of 301 and a rectangular end fittingly connected to the proximal end of the open channel of the trough of the isopipe. The design of FIG. 3 results in the longitudinal axis 307 of the elliptic cylindrical part 301 being lower than the center of the rectangular end of 303. The glass melt is contained by an edge guide (not shown) and is not allowed to overflow the first trough top surface 313 until it reaches the location 311, where the edge guide ends. As is shown in FIG. 5, the second axis of the elliptic cylindrical portion is larger than the width of the transition portion in the direction of line 501. Therefore, the glass flow is compressed in width but enlarged in height when it exits the elliptic cylindrical part and enters into the transition part. As FIG. 3 shows, this inlet assembly arrangement can achieve overflow of the glass melt at the overflow starting position 311. However, it was found that this arrangement was not acceptable for larger-size isopipes having a length of over 3000 mm, as discussed infra.

As a result of in-depth research and development effort for the operation of large-size isopipe, the present inventors came up with an inverted design of the horizontal part of the inlet assembly, an embodiment of which is illustrated in FIG. 6. Similar to the design of FIG. 3, the horizontal part of the inlet assembly includes a first part 607 having a longitudinal axis 607, and a transition part 603 with one end connected with the first part 601, and a second end fittingly connected with the proximal end of the open channel of the trough of the isopipe. In the embodiment shown in FIGS. 6, 7 and 8, the first part 601 has an elliptic cylindrical shape, i.e., an elliptical cross-section, and the transition part has an elliptic cylindrical end connected with the first part 601, and a rectangular end connected with the proximal end of the open channel of the trough of the isopipe. It should be understood that other cross-section of the first part, and therefore other cross-section of the transition part, may be used. For example, the first part may have a cross-section with a rectangular or square shape, a pear shape, a heart shape, or other shape. The first axis of the cross-section of the first part is its vertical center line, and the second axis of the cross-section of the first part is its horizontal center line. The center of the cross-section is the cross point of the first and second axes. It is desired that the cross-section of the first part is substantially symmetric with respect to the first axis thereof. Due to the inverted design, the longitudinal axis 607 of 601 is higher than the center of the rectangular end of the transition part 603. The center of the rectangular end is the cross-point of the diagonal lines of the rectangular cross-section. Likewise, the glass melt is restricted by an edge guide (not shown) and is not allowed to overflow the first trough top surface 613 until the location 611. In addition, as shown in FIGS. 7 and 8, the first part 601 has a cross-section having a first axis in the direction of 803 (the direction of the gravity vector in certain embodiments) and a second axis in the direction 803, which is perpendicular to 801. In the embodiment as shown in FIGS. 7 and 8, the second axis of the first part 601 is larger than the width of the rectangular end of the transition part 603, resulting in a glass flow that is compressed in the width direction and enlarged in the height direction. In a particularly desirable embodiment, the first part of the horizontal part of the inlet assembly takes the shape of a cylinder at least in the segment directly connected to the transition closed channel. As a result of this inverted set-up, the velocity of the glass melt in the surface region is higher than in the bottom region, and the velocity of the glass melt in the surface in the region proximate to the overflow starting point is higher than the embodiment shown in FIGS. 3, 4 and 5, assuming all other conditions being equal. While the embodiment shown in FIGS. 6, 7 and 8 have a second axis larger than the width WW(IE) of the cross-section of the open channel at the proximal end of the isopipe, such relationship is not required. In certain embodiments, the second axis of the first part may be smaller than WW(IE). Nonetheless, it is advantageous to establish a reliable glass stream covering the intended areas of the first and second trough top surfaces and the side surfaces of the isopipe where the ratio of WW(IE) to the length of the second axis of the first part is from 0.5 to 0.95, in certain embodiments from 0.6 to 0.9, in certain embodiments from 0.6 to 0.8, in certain other embodiments from 0.6 to 0.7.

It is highly desirable that the first axis of the first part is smaller than the height HH(IE) of the rectangular cross-section of the open channel of the trough-shaped part at the end of the open channel connecting with the second transition closed channel. This would result in the enlargement of the glass flow in the direction in the vertical direction when the glass melt flows from the first part to the transition part. The enlargement allows the formation of a reliable stream of glass over the weir surfaces and the isopipe side surfaces. In certain embodiments, the ratio of the first axis of the cross-section of the first part to HH(IE) is from 0.5 to 0.95, in certain embodiments from 0.6 to 0.9, in certain embodiments from 0.6 to 0.8, in certain other embodiments from 0.6 to 0.7.

Likewise, in order to obtain a symmetrical glass stream over both sides of the isopipe, it is highly desired that the placement of the transition closed channel is such that it is symmetrical with respect to the center plane 199 of the open channel of the trough of the isopipe. It is further desired that in certain embodiment at least part of the cylindrical closed channel connected with the transition closed channel is located such that it is symmetrical with respect to the center plane of the open channel of the isopipe.

In certain embodiments, the distance from the center of the cross-section of the end of the first part connecting with an end of the second transition closed channel to a plane perpendicular to the gravity vector and tangential to a bottom line of the open end of the open channel is DT1; the distance from the free surface of the molten glass abutting the end of the open channel to the plane perpendicular to the gravity vector and tangential to a bottom line of the open end of the open channel is DT2; and DT1/DT2≥0.50; in certain embodiments DT1/DT2≥0.60; in certain embodiments DT1/DT2≥0.70; in certain embodiments DT1/DT2≥0.80; in certain embodiments DT1/DT2≥0.90. This arrangement allows for the establishment of a faster surface region glass melt velocity relative to the bottom region glass melt velocity. In addition, this apparatus set-up would result in faster and more stable establishment of a glass ribbon flowing over the weir surfaces with a more uniform thickness across the width of the open channel from the proximal end to the distal end.

To obtain symmetrical glass flow on both sides of the isopipe using the invention of the present invention, it is highly desirable that the velocity distribution of the stream of molten glass immediately before exiting the end of the first part is symmetrical with respect to the center plane of the open channel. In certain embodiments, it is even desirable that the velocity distribution of the stream of molten glass immediately before exiting the end of the first part is symmetrical with respect to a plane perpendicular to the gravity vector and passing through the second axis of the cross-section of the first part.

A second aspect of the present invention is an apparatus for making a glass sheet comprising:

(a) a forming body comprising a trough-shaped part over a wedge-shaped part, the trough-shaped part having a first trough side wall and a second trough side wall over a trough bottom surface defining an open channel having an open end, the open channel having a center plane, the first trough side wall having a first internal trough surface, a first trough top surface and a first external trough side surface, the second trough side wall having a second internal trough surface, a second trough top surface and a second external trough side surface, the wedge-shaped part having a first wedge side surface connecting with the first external trough side surface, a second wedge side surface connecting with the second external trough side surface, the first and second wedge side surfaces sloping downwardly to join at a root line; and (b) a tube defining a closed channel connecting with the open channel of the trough-shaped part through the open end of the open channel, the tube comprising:

(b1) a first part having a cross-section when intersected by a plane perpendicular to the center plane having a first axis parallel to the gravity vector if the center plane is parallel to the gravity vector, and a second axis perpendicular to the first axis; and (b2) a second transition closed channel fittingly connecting the first part with the open channel of the trough-shaped part;

wherein:

the distance from the center of the cross-section of the end of the first part connecting with an end of the second transition closed channel to a plane perpendicular to the first axis and tangential to a bottom line of the open end of the open channel is DT1;

the distance from the first trough top surface at the end of the open channel to the plane perpendicular to the first axis and tangential to a bottom line of the open end of the open channel is DT2; and DT1/DT2≥0.50; in certain embodiments DT1/DT2≥0.60; in certain embodiments DT1/DT2≥0.70; in certain embodiments DT1/DT2≥0.80; in certain embodiments DT1/DT2≥0.90.

Detailed description of the various embodiments of the apparatus of the present invention can be found in the above description of the process.

Figure 11:
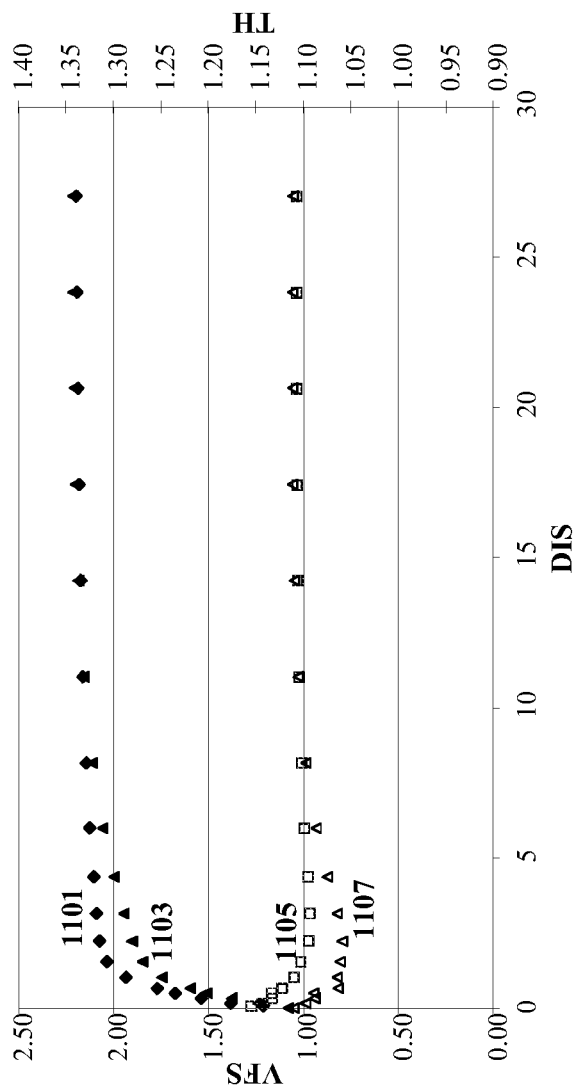
FIG. 11 is a diagram showing calculated surface velocity and thickness profiles of the glass melt overflowing the isopipe illustrated in FIG. 10 using the inlet assembly of FIGS. 3 and 6, respectively.
Figure 10:
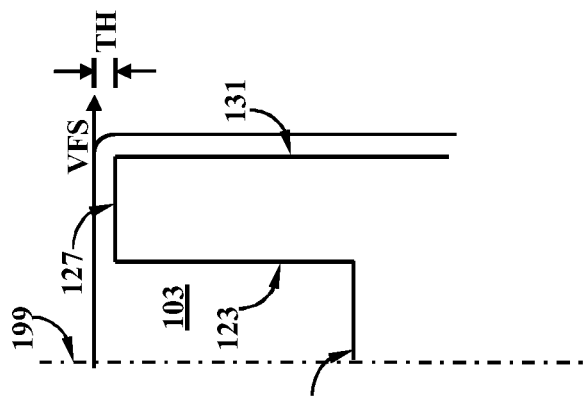
FIG. 10 shows a partial enlarged view of a corner of the isopipe in operation illustrated in FIG. 2 showing glass melt overflowing a second trough top surface.

Simulation of the glass melt flow over an isopipe having a length of over 3000 mm was conducted using the apparatus set-up of FIG. 3 and FIG. 6, respectively. The magnitude of the velocity vector of the glass melt at the free surface (VFS) above the second trough top surface and the thickness of the glass melt (TH) were calculated using a fluid dynamics model assuming that the conditions were identical for both set-ups except for the configuration of inlet assembly as shown in FIGS. 3 and 6. Although VFS is shown to be substantially perpendicular to the center plane 199 in FIG. 10, it is not required to be so. In FIG. 11, the solid diamond-shaped data series are the VFS of the glass melt using the set-up of FIG. 6; the solid triangle-shaped data series are the VFS of the glass melt using the set-up of FIG. 3; the hollow square-shaped data series 1105 are the thickness TH of the glass melt using the set-up of FIG. 6; and the hollow triangle-shaped data series 1107 are the thickness TH of the glass melt using the set-up of FIG. 3. The left vertical axis shows the VFS; the right vertical axis shows the thickness TH scale; and the horizontal axis shows the distance from the point where the overflow of the glass melt starts along the top second trough surface 127. The same data are presented in FIG. 12 in a different manner, where the solid diamond-shaped data series 1201 shows the percentage increase of VFS by using the FIG. 6 set-up compared to using the FIG. 3 set-up (VI, the scale of which is shown on the left vertical axis); and the hollow square-shaped data series 1203 show the percentage change of glass melt thickness (THI, the scale of which is shown in the right vertical axis); and the horizontal axis show the distance from the location where glass melt overflow starts along the second trough top surface 127.

Figure 12:
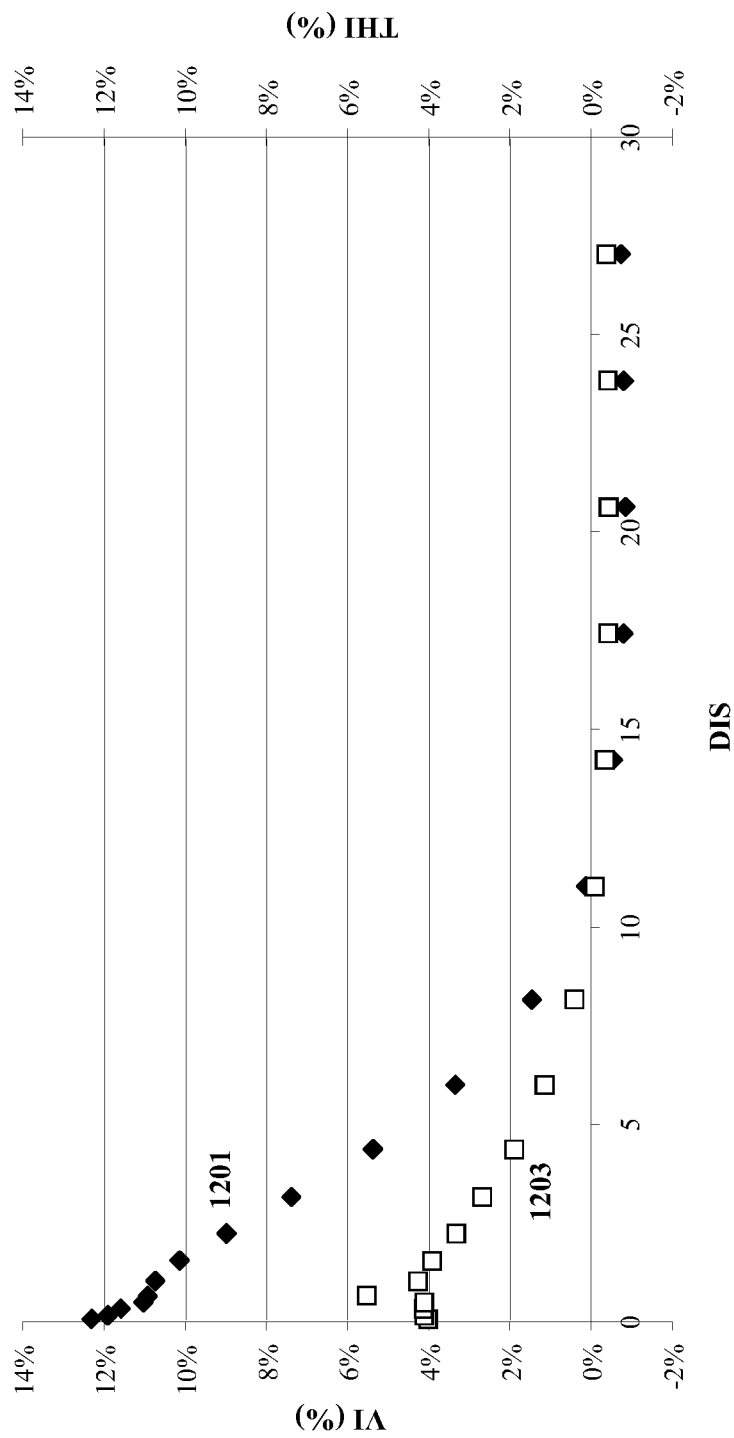
FIG. 12 is a diagram showing glass melt surface velocity increase and thickness increase by using the FIG. 6 set-up over using the FIG. 3 set-up.

Data in FIGS. 11 and 12 clearly show the following. The FIG. 6 set-up, an embodiment of the present invention, resulted in a much more uniform surface velocity and a much more uniform thickness of the glass melt across the length of the second trough top surface 127. Using the set-up of FIG. 3 resulted in both low surface glass melt velocity and glass melt thickness in area close to the overflow starting point. Using the set-up of FIG. 6 greatly increased the surface glass melt velocity (up to 12%) and initial glass melt thickness (up to 4%) in locations close to the overflow starting point. Therefore, a glass ribbon having more uniform thickness can be established using the set-up of FIG. 6 than using the set-up of FIG. 3. Moreover, the more uniform velocity and thickness profiles of the glass stream over the weir top surfaces lead to a more reliable and consistent glass sheet drawing process.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. An apparatus for making a glass sheet comprising:
   (a) a forming body comprising a trough-shaped part over a wedge-shaped part, the trough-shaped part having a first trough side wall and a second trough side wall over a trough bottom surface defining an open channel having an open end, the open channel having a center plane, the first trough side wall having a first internal trough surface, a first trough top surface and a first external trough side surface, the second trough side wall having a second internal trough surface, a second trough top surface and a second external trough side surface, the wedge-shaped part having a first wedge side surface connecting with the first external trough side surface and a second wedge side surface connecting with the second external trough side surface, the first and second wedge side surfaces sloping downwardly to join at a root line; and
   (b) a tube defining a closed channel connecting with the open channel of the trough-shaped part through the open end of the open channel, the tube comprising:
   (b1) a first part, which is a closed channel, and
   (b2) a second part, which is a transition closed channel, said second part fittingly connecting the first part with the open channel of the trough-shaped part;
   wherein:
   said first part has a first part cross-section in a plane perpendicular to the center plane of the open channel, said first part cross-section (i) having a center and (ii)

being located at the end of the first part where the first part connects with the second part;

the open end of the open channel has an open end cross-section which has a bottom line;

the distance from the center of said first part cross-section to a plane which is perpendicular to the gravity vector and contains said bottom line is DT1;

the distance from the first trough top surface at the open end of the open channel to said plane which is perpendicular to the gravity vector and contains said bottom line is DT2; and DT1/DT2≥0.50.

2. An apparatus according to claim 1, wherein said first part cross-section is elliptical.

3. An apparatus according to claim 1, wherein
the first part cross-section has a vertical center line and a length along said vertical center line;
the first part cross-section has a horizontal center line and a length along said horizontal center line; and
the ratio of the length along the vertical center line to the length along the horizontal center line ranges from 1.0 to 3.0.

4. An apparatus according to claim 1, wherein
the first part cross-section has a horizontal center line and a length along said horizontal center line; and
said length along said horizontal center line is larger than the width WW(IE) of a cross-section of the open channel of the trough-shaped part, said cross-section of the open channel being at the end of the open channel where the open end connects with the second part of the closed channel.

5. An apparatus according to claim 4, wherein the ratio of WW(IE) to said length along said horizontal center line is from 0.5 to 0.95.

6. An apparatus according to claim 1, wherein
the first part cross-section has a vertical center line and a length along said vertical center line;
the open channel of the trough-shaped part has a rectangular cross-section at its end where it connects with the second part;
said rectangular cross-section has a height HH(IE);
the length along said vertical center line is smaller than HH(IE).

7. An apparatus according to claim 6, wherein the ratio of the length along said vertical center line to HH(IE) is from 0.5 to 0.95.

8. An apparatus according to claim 1, wherein the second part is symmetrical with respect to the center plane.

9. An apparatus according to claim 1, wherein at least part of the first part is symmetrical with respect to the center plane.

10. An apparatus according to claim 1, wherein the open channel has a length LL, LL≥1200 mm.

* * * * *